May 4, 1926.
J. W. McBURNEY
1,583,600
MEANS FOR TESTING OIL
Filed August 29, 1922
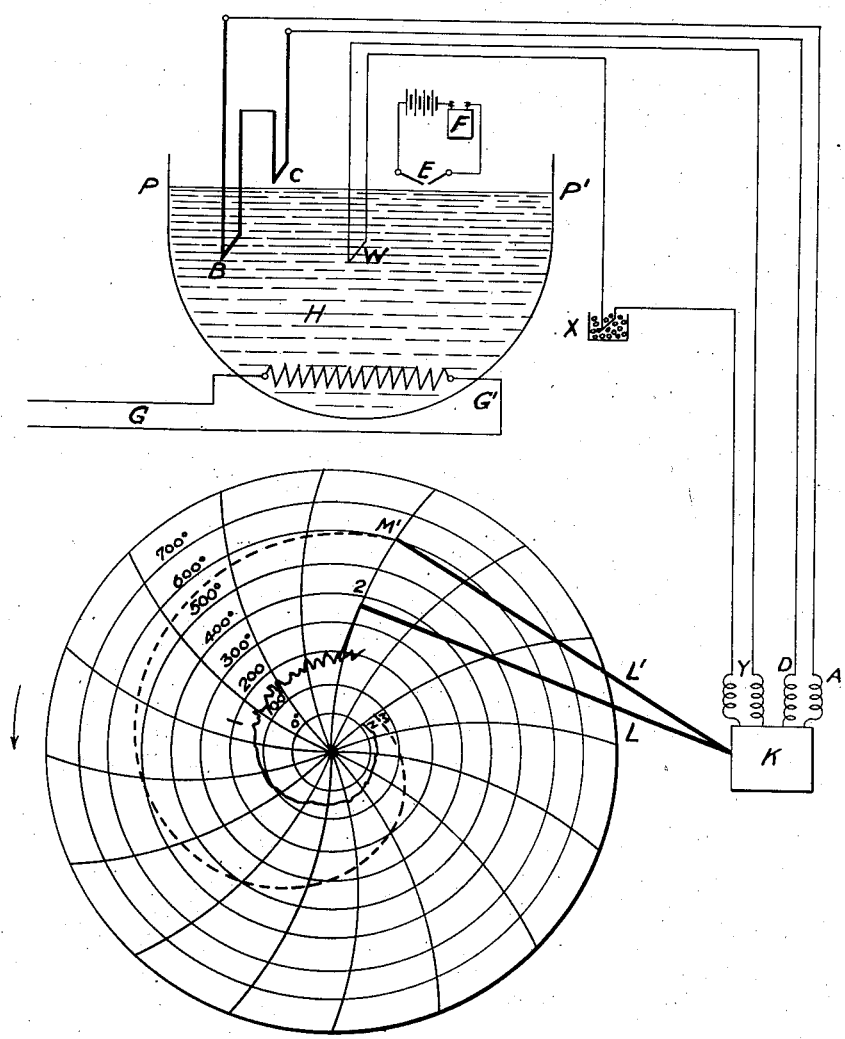

Patented May 4, 1926.

1,583,600

UNITED STATES PATENT OFFICE.

JOHN WHITE McBURNEY, OF YOUNGSTOWN, OHIO.

MEANS FOR TESTING OIL.

Application filed August 29, 1922. Serial No. 585,106.

*To all whom it may concern:*

Be it known that I, JOHN W. McBURNEY, a citizen of the United States of America, residing at Youngstown, in the county of Mahoning and State of Ohio, have invented certain new and useful Improvements in Means for Testing Oil, of which the following is a specification.

This invention relates to the improvements in physical testing of oils. The invention relates particularly to an improved method for making the tests known as "determination of flash and fire points on oils". This test briefly described, is as follows:—

Determining the minimum temperature, first, at which the oil being tested will give off sufficient vapors to form an explosive mixture with air, which temperature is the "flash" point, and is recognized by the passage of a momentary flame across the surface of the oil, when a free flame is applied to the surface, the oil being heated in a suitable container. Second, the temperature continuing to be raised and the free flame being applied at regular intervals, a point will ultimately be reached where owing to vapors being given off in sufficient quantity the flame of the flash, instead of going out will continue burning. The minimum temperature at which this will take place is the fire point.

The test is now usually performed manually, in the following manner: A thermometer is immersed in the oil, heat applied to the cup containing the oil, usually a gas flame, and a small gas flame applied to the surface of the oil at regular intervals. The flash and fire are determined by eye.

The purpose of this invention is to improve this test by substituting for the optical determination of the flash and fire point, a determination based upon the production of electrical currents. In the apparatus as hereinafter described either resistance thermometers or thermo-couples may be used. The apparatus may be wholly automatic as herein described or partially automatic, due to the elimination of the recording features. The description and diagram as hereinafter given apply to the use of thermo-couples and the full application of automatic features. In the accompanying drawings the figure is a diagrammatic view of the thermo-couple arrangement.

The parts A—B and C—D are of the same kind of wire (copper) but the part B—C is of a different kind of wire. Now if the points B and C, the junction points of the two different kinds of wires, are at different temperatures a current will tend to flow thru the circuit A—B—C—D, the amount of which current by means of suitable devices, well known and on the market, may be recorded or made the control of automatic machinery. The amount of the current will bear a direct relation to the difference in temperature between the points B and C.

Referring again to the diagram, the oil to be tested, H, is contained in the cup shown in cross section which is heated by the electrical heater G—G'. The surface of the oil is P—P'. E—F is a device for producing an electrical spark at the point E.

The method of operation is that the temperature of the oil is gradually raised by the action of the heater G—G'. There is only a small temperature difference between the points B and C owing to the one being immersed in the oil and the other being only a very short distance above the oil. There being only this small temperature difference, there will be a comparatively small current resulting from the thermo-couple. At suitable intervals either of time or temperature under the control of the automatic devices hereafter to be referred to, a spark is produced at E. When the oil has been brought up to the temperature at which enough vapor is being given off so that the sparker E ignites the mixture of air and vapor, a flame across the surface of the oil from E to C, the point of the thermo-couple at C will be momentarily elevated in temperature, which will cause a throw or jump off the current. This first throw of the current will be recognized as the "flash point".

These throws continue with each excitation of the sparker, increasing in intensity until the point is reached where under the influence of the elevated temperature vapors are given off in sufficient quantity to support continuous combustion, in other words the fire point. At this point a large permanent increase of the current generated in the thermo-couple circuit A—B—C—D takes place. At this point in the completed machine the source of heat would be cut off or removed and the flame smothered by shutting off the supply of air.

The actual temperature of the oil is being measured all this time by means of another thermo-couple arrangement, W—X—Y in the diagram. W is one junction of the thermo-couple immersed in the oil as was B. The other junction, X, is immersed in ice-water or some other suitable constant temperature bath. This is a well-known device common to all instruments using thermo-couples for measuring temperature.

Now there are on the market several devices for taking very small currents such as are produced by the thermo-couples and using them as controllers or "boosters" for larger currents capable of doing any work needed. It is proposed to use some one of these devices, controlled by the thermo-couple currents previously described, having such recorders as hereinafter described, operated together with such automatic actions as cutting off the source of heat, applying the spark or flame at predetermined intervals or such other actions deemed advisable in the completed machine.

The record is made on a circular revolving dial to which is applied sheets of paper suitably printed with a temperature scale in proper alinement for the levers L and L', which operate inking pens on the surface of the paper. The L lever is under the control of the thermo-couple circuit A—B—C—D while the L' lever which indicates actual temperatures, is under the control of the thermo-couple circuit W—X—Y.

In the diagram the chart shows a record that would be expected to be as in actual practice. The line M—M' is the temperature line. It will be seen that it steadily rises, i. e., moves from the center of the chart. The line N—N' is the line that is the result of the action of the thermo-couple A—B—C—D. The first break (flash point) is at 1, the fire point is 2 on the line. On reading this record it will be seen that the flash point takes place at 520° while the fire point is at 600°.

The device for producing the spark at E may be operated either electrically or by suitable clock-work. Considerable variation is allowable in the degrees of automatic operation of the instrument. In place of the recording apparatus as illustrated, the thermo-couples or resistance thermometers may be connected with indicating devices such as are well-known and securable on the market. If the recording feature should be eliminated, the indicator consisting of two moving arms, one of which under the influence of a W—X—Y circuit would indicate actual temperature of oil, being read by a suitably graduated dial, the other arm would serve by its motions to indicate the incidence of the flash and fire point.

Having described my invention, what I claim is:

1. In a device for testing oil, thermo-couples so placed that they will be affected by the difference in temperature within a body of oil and at a point just above the surface of the oil, and temperature indicating means.

2. In a device for testing oil, thermo-couples so placed that they will be affected by the difference in temperature within a body of oil and at a point just above the surface of the oil, means for transferring in terms of electrical current the temperature differences so indicated, and temperature indicating means.

3. In a device for testing oil, thermo-couples so placed that they will be affected by the difference in temperature within a body of oil and at a point just above the surface of the oil, temperature indicating means, means for transferring in terms of electrical current the temperature differences so indicated, and means controlled by the electrical current to produce a graphic record of the temperature differences.

4. In a device for testing oil, thermo-couples so placed that they will be affected by the difference in temperature within a body of oil and at a point just above the surface of the oil, temperature indicating means, means for transferring in terms of electrical current the temperature differences so indicated, and means controlled by the electrical current to produce a graphic record of the temperature differences, said record consisting of the comparison of the temperature within the body of the oil with the fluctuating temperature due to intermittance burning of vapor at a point just above the surface of the oil.

5. A device for testing oil in combination with an oil receptacle one section of said couple being within the receptacle below the oil surface thereof, and the other section above the surface of the oil, means for heating the oil in said receptacle, means for igniting the gasified oil as the temperature of the oil is raised, means for registering the current generation in the thermo-couple and means for determining the temperature of the oil during heating to ascertain the "flash" and "flame" points thereon.

6. An oil testing device comprising an oil receptacle, a thermo-couple having one section thereof within the oil of said receptacle and the other section above the surface of the oil, means for heating the oil, means for igniting the gasified oil as the temperature of the oil is raised, means for registering the current generated by the thermo-couple, a second thermo-couple for determining the temperature of the oil and means for indicating said temperature in conjunction with the registration of the current of the first-mentioned thermo-couple.

In testimony whereof I affix my signature.

JOHN WHITE McBURNEY.